US012276246B2

(12) United States Patent
Dellinger et al.

(10) Patent No.: US 12,276,246 B2
(45) Date of Patent: Apr. 15, 2025

(54) HYDRAULIC SYSTEM FOR A WATER NETWORK AND WATER NETWORK COMPRISING SUCH A SYSTEM

(71) Applicants: ECOLE NATIONALE DU GÉNIE DE L'EAU ET DE L'ENVIRONNEMENT DE STRASBOURG, Strasbourg (FR); UNIVERSITE DE STRASBOURG, Strasbourg (FR); CENTRE NATIONAL DE LA RECHERCHE SCIENTIFIQUE, Paris (FR)

(72) Inventors: Nicolas Dellinger, Schmittviller (FR); Guilhem Dellinger, Schmittviller (FR); José Vasquez, Haguenau (FR)

(73) Assignees: ECOLE NATIONALE DU GÉNIE DE L'EAU ET DE L'ENVIRONNEMENT DE STRASBOURG, Strasbourg (FR); UNIVERSITE DE STRASBOURG, Strasbourg (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 174 days.

(21) Appl. No.: 18/010,730

(22) PCT Filed: Jun. 23, 2021

(86) PCT No.: PCT/EP2021/067208
§ 371 (c)(1),
(2) Date: Dec. 15, 2022

(87) PCT Pub. No.: WO2021/260040
PCT Pub. Date: Dec. 30, 2021

(65) Prior Publication Data
US 2023/0340935 A1    Oct. 26, 2023

(30) Foreign Application Priority Data

Jun. 24, 2020   (FR) ...................................... 2006635

(51) Int. Cl.
*F03B 13/00*    (2006.01)
(52) U.S. Cl.
CPC .......... *F03B 13/00* (2013.01); *F05B 2220/20* (2013.01); *F05B 2250/82* (2013.01)
(58) Field of Classification Search
CPC ... F03B 13/00; F05B 2220/20; F05B 2250/82
See application file for complete search history.

(56) References Cited

U.S. PATENT DOCUMENTS

| 4,740,711 A | 4/1988 | Sato et al. | |
| 7,605,485 B2 * | 10/2009 | Pitchford | G01F 15/063 |
| | | | 290/43 |

(Continued)

FOREIGN PATENT DOCUMENTS

| CA | 2 926 053 A1 | 4/2015 |
| CN | 105443298 A | 3/2016 |

(Continued)

OTHER PUBLICATIONS

International Search Report as issued in International Patent Application No. PCT/EP2021/067208, dated Oct. 14, 2021.

*Primary Examiner* — Julio C. Gonzalez
(74) *Attorney, Agent, or Firm* — Pillsbury Winthrop Shaw Pittman LLP

(57) ABSTRACT

A hydroelectric facility for generating electrical energy from the flow of water circulating in a water network, includes at least one cross-flow pico-turbine mounted on a shaft extending perpendicular to a direction of the water flow, the pico-turbine including a substantially annular blade installed in the water flow in order to generate a mechanical energy of rotation, at least one generating unit, installed outside of (Continued)

the water flow and coupled to the shaft of the pico-turbine in order to transform the mechanical energy of rotation into electrical energy, at least one measurement and control unit, installed outside of the water flow, connected to the generating unit, controlling the distribution of the collected electrical energy as well as the rotation of the pico-turbine depending on the characteristics of the water flow.

17 Claims, 3 Drawing Sheets

(56) References Cited

U.S. PATENT DOCUMENTS

| | | | |
|---|---|---|---|
| 7,768,146 B2 * | 8/2010 | Balzano | F03B 13/00 290/43 |
| 2007/0145751 A1 | 6/2007 | Roos | |
| 2010/0253081 A1 * | 10/2010 | Schlabach | F03B 13/00 416/214 R |
| 2012/0007364 A1 * | 1/2012 | David | F03B 13/10 290/54 |
| 2013/0292945 A1 | 11/2013 | Schlabach et al. | |
| 2014/0062092 A1 * | 3/2014 | Stausgaard | F03B 17/063 415/224 |

FOREIGN PATENT DOCUMENTS

| | | | |
|---|---|---|---|
| CN | 105547614 A | | 5/2016 |
| CN | 111006730 A | | 4/2020 |
| CN | 111197549 A | * | 5/2020 |
| FR | 3 010 150 A1 | | 3/2015 |
| WO | WO 2010/117621 A2 | | 10/2010 |
| WO | WO 2020/121141 A1 | | 6/2020 |

* cited by examiner

HYDRAULIC SYSTEM FOR A WATER NETWORK AND WATER NETWORK COMPRISING SUCH A SYSTEM

CROSS-REFERENCE TO RELATED APPLICATIONS

This application is the U.S. National Stage of PCT/EP2021/067208, filed Jun. 23, 2021, which in turn claims priority to French patent application number 2006635 filed Jun. 24, 2020. The content of these applications are incorporated herein by reference in their entireties.

TECHNICAL FIELD OF THE INVENTION

The present invention relates to a hydraulic system adapted to generate electrical energy from a water stream circulating in a water network. It also relates to a water network including such a system.

The invention finds applications in the field of water distribution and especially water distribution in drinking water networks in towns, irrigation networks or industrial networks.

TECHNOLOGICAL BACKGROUND OF THE INVENTION

Nowadays, water supply networks are multiplying in our territories, both to bring water to homes or industries and to ensure land irrigation.

Water supply networks, also called distribution networks or water networks, are subject to strict sanitary and hydraulic standards. These relate especially to the physicochemical quality of water and to the pressures at the various ends of the systems.

A water supply network can extend over very large areas, for example, areas of several kilometres, tens of kilometres or even hundreds of square kilometres, depending on the size of the zone to be supplied. For this, a water supply network consists of a plurality of pressure conduits forming a pipe network where the flow is driven either by gravity or using pumping systems when the relief is insufficient to allow gravitation. The complexity and size of the zones to be supplied mean that water supply networks are generally very complex in shape. Indeed, they can consist of a multitude of meshes and branches, or even sub-networks.

The complex shape of these water supply networks, the strict standards to be met and the complexity of the physical phenomena governing the flows under pressure make the management of a water supply network complicated. Good management of the water supply network therefore requires numerous measurement points, integrated within said network, to enable measurements to be taken, mainly of a physicochemical and flow rate type. The physicochemical measurements are necessary to ensure the drinkability of the water throughout the hydraulic system. The flow rate measurements are essential for estimating and optimising the hydraulic efficiency of the water distribution network. Furthermore, these flow rate measurements make it possible to detect and locate possible leaks in the network quickly when they are carried out at a high number of measuring points.

To carry out these physicochemical and flow rate measurements, it is known to use measurement sensors, set up at various measurement points in the distribution network. These sensors can, for example, be installed in manholes distributed over the surface of the distribution network. These sensors need to be power supplied. Similarly, flow meters for measuring the flow rate of water stream in the pipe have to be installed in the water supply network and power supplied. A power supply is therefore required not only to operate the various measurement sensors, but also to enable transmission of the data measured by the sensors to a remotely installed distribution network manager. Although each sensor requires little electric power, the sensors as a whole require a significant amount of electrical power. Furthermore, the fact that the sensors are distributed over the entire surface of the water supply network requires the connection of each measuring point to the power network, including the isolated measurement zones, which has the effect of being relatively expensive.

In order to avoid the costs of connection to a power network, water suppliers have considered using the hydraulic energy available in the flow under pressure to supply the sensors and/or the data transmission system with power. For this, they have suggested the introduction of hydraulic systems within the pipes to transform the energy of the water stream into electrical energy. These hydraulic systems generally include a small turbine—called a pico-turbine—which, under the effect of water pressure, generates mechanical rotational energy which is then transformed into electrical energy by a generator. More precisely, the pico-turbine includes a rotating element placed in the water stream and rotatably moved by drag or lift forces, this rotation allowing energy of the water stream to be converted into mechanical energy. The axis of rotation of the rotating element can be positioned in parallel (axial type pico-turbine) or perpendicularly (radial type pico-turbine) to the flow axis of the water.

Most of these hydraulic systems, such as those described in documents U.S. Pat. No. 4,740,711, US 2007/0145751 A1 and CA 2 926 053, are housed, in their entirety, in a pipe of the water supply network, which results in generating head losses within the water supply network and therefore in modifying the hydraulic behaviour of said water supply network. In order to limit the impact on the hydraulic behaviour of the water supply network, some hydraulic systems provide a bypass pipe, called bypass circuit, which is mounted in parallel to a standard pipe of the water supply network. However, a bypass circuit not only has a large overall size, but is also expensive to install as it requires structural modification of the entire zone of the pipe network in which it is installed.

Furthermore, setting these known hydraulic systems generally requires a complex implementation, with cutting of the original pipe, placing of a specific pipe section integrating the hydraulic system between two cut parts of the original pipe and attachment of the different pipe sections together hermetically. However, since the different pipe sections should be able to withstand the pressure of the water stream, this hermetic attachment is delicate and therefore costly in terms of both material and work time.

In some of these hydraulic systems, such as those described in documents CA 2 926 053 and FR 3 010 150, when the pico-turbine is of the axial type, that is, with an axis of rotation parallel to the direction of the water stream, the pico-turbine occupies the major part of the flow-through section of the water stream, which causes a significant drop in pressure, even when the pico-turbine is stopped. Furthermore, axial pico-turbines require complex system operations.

In some other hydraulic systems, such as that described in document WO 2010/117621 A3, when the pico-turbine is of the radial type, that is, with an axis of rotation perpendicular to the direction of the water stream, the pico-turbine generates an overall size in the pipe all the more significant as the number of blades is high and as the blades end with a flange, which has a strong impact on the flow of the water stream and induces a non-negligible head loss.

Whether they are of radial or axial type, the pico-turbines of known hydraulic systems generate a modification of the hydraulic behaviour in the water supply network, especially with a pressure loss at the pico-turbine outlet. This consequence is all the more important as the level difference of the water supply network is low, and can even lead to a zero pressure at the end of the network.

Furthermore, when the level differences of the water supply network are low, for example in lowland zones, it is common to observe changes in the direction of water stream in the pipes. These changes of direction are generally induced by the water demand of the consumers which varies strongly during a day, for example in a zone where a factory has a high-water consumption during the day whereas in the evening the factory is closed and the factory staff is at home. However, the pico-turbines of the known hydraulic systems are provided to operate in only one direction of water stream, which has the effect that not only the energy is no longer recovered, but also that the pico-turbine, now useless, generates a head loss in the distribution network. In addition, when the direction changes are not provided for, they can damage the power electronics of the pico-turbine.

There is therefore a real need for a low-cost hydraulic system, easy to install in an existing water supply network and adapted to operate in both water stream directions, with a low impact on the hydraulic behaviour of said network.

SUMMARY OF THE INVENTION

In order to address the various problems discussed above, especially the complexity of setting up, the overall size and the impact on the hydraulic behaviour of the distribution network, the applicant provides a hydraulic system in which only the pico-turbine is installed in the pipe and which includes a substantially annular shaped blade with a small overall size and a low impact on the hydraulic behaviour of the distribution network.

According to a first aspect, the invention relates to a hydraulic system for generating electrical energy from a water stream circulating in a water network, including:
  at least one cross flow pico-turbine mounted to a shaft extending perpendicularly to a direction of said water stream, said pico-turbine including a substantially annular shaped blade, installed in the water stream to generate mechanical rotational energy,
  at least one generator unit, installed out of the water stream and coupled with the shaft of the pico-turbine to transform the mechanical rotational energy into electrical energy,
  at least one control unit, installed out of the water stream, connected to the generator unit and controlling distribution of the electrical energy collected as well as the rotation of the pico-turbine according to the characteristics of the water stream.

This hydraulic system is not only easy to set up in an existing distribution network, but it also allows electrical energy to be generated whatever the direction of water stream, with a low impact on the hydraulic behaviour within said network.

The person skilled in the art will understand that the water stream can be a pure or impure, loaded or not loaded water stream. In other words, "water stream" refers to a flow of a liquid containing water mixed or not with one or more other fluids and/or loaded with particles or solid matter.

In addition to the characteristics just discussed in the preceding paragraph, the hydraulic system according to one aspect of the invention may have one or more of the following additional characteristics, considered individually or in any technically possible combination:
  the hydraulic system includes a measurement unit indirectly determining a measurement of the flow rate of the water stream.
  the measurement unit is adapted to determine the direction of the water stream.
  the annular blade has a cross-section in the form of a wing profile.
  the annular blade includes two circular arc blades having the same radius, mounted end to end.
  the shaft of the pico-turbine is mounted at a single point of the annular blade, at a junction between the ends of the two circular arc blades.
  it includes an adaptive base plate, installed out of the water stream and capable, on the one hand, of keeping the shaft of the pico-turbine radial with respect to the direction of the water stream and, on the other hand, of supporting the control unit as well as the generator unit.
  it includes at least one measurement sensor mounted in the adaptive base plate.
  the generator unit includes a brushless DC generator connected to a microcontroller.
  the control unit includes a telecommunication module capable of exchanging data with a remote processing system.
  it includes a device for storing electric power produced.
  it includes a clip system capable of holding the adaptive base plate around a pipe in which the water stream circulates.
  it includes a sealed casing in which the generator unit and the control unit are mounted.

Another aspect of the invention relates to a water network comprising a plurality of pipes connected to each other so as to form a pipe network in which a water stream circulates, characterised in that it includes at least one hydraulic system as defined above, mounted in at least one of the pipes of the pipe network, the pico-turbine being housed inside the pipe and the generator unit and the measurement and control unit being housed outside said pipe.

This water network may have one or more additional characteristics among the following, considered individually or in any technically possible combination:
  the pipe includes a flow-through opening, having dimensions adapted to the external dimensions of the pico-turbine so as to allow passage of the annular blade inside the pipe, the flow-through opening being capable of having the shaft of the pico-turbine passing therethrough.
  the adaptive base plate of the hydraulic system includes a lower surface forming a plug around the shaft of the pico-turbine, capable of hermetically closing the flow-through opening.
  the adaptive base plate of the hydraulic system includes a lower surface of rounded shape, adapted to fit snugly an external wall of the pipe.
  the annular blade of the pico-turbine includes an external radius greater than at least ⅔ of an internal radius of the pipe.
  the hydraulic system is installed in a manhole of said network, on an existing pipe.

In the following description, the terms "lower" and "upper" are used according to their position with respect to the water stream, an upper part of an element being further away from the water stream than a lower part.

BRIEF DESCRIPTION OF THE FIGURES

Further advantages and characteristics of the invention will become apparent upon reading the following description, illustrated by the figures in which.

DETAILED DESCRIPTION

An example of an easy to set up hydraulic system configured to generate electrical energy regardless of the direction of water stream, with a low impact on the hydraulic behaviour within the water network, is described in detail below, with reference to the appended drawings. This example illustrates the characteristics and advantages of the invention. It is however reminded that the invention is not limited to this example.

In the figures, identical elements are marked by identical references. For the sake of readability of the figures, the size scales between represented elements are not respected.

Figure 1:
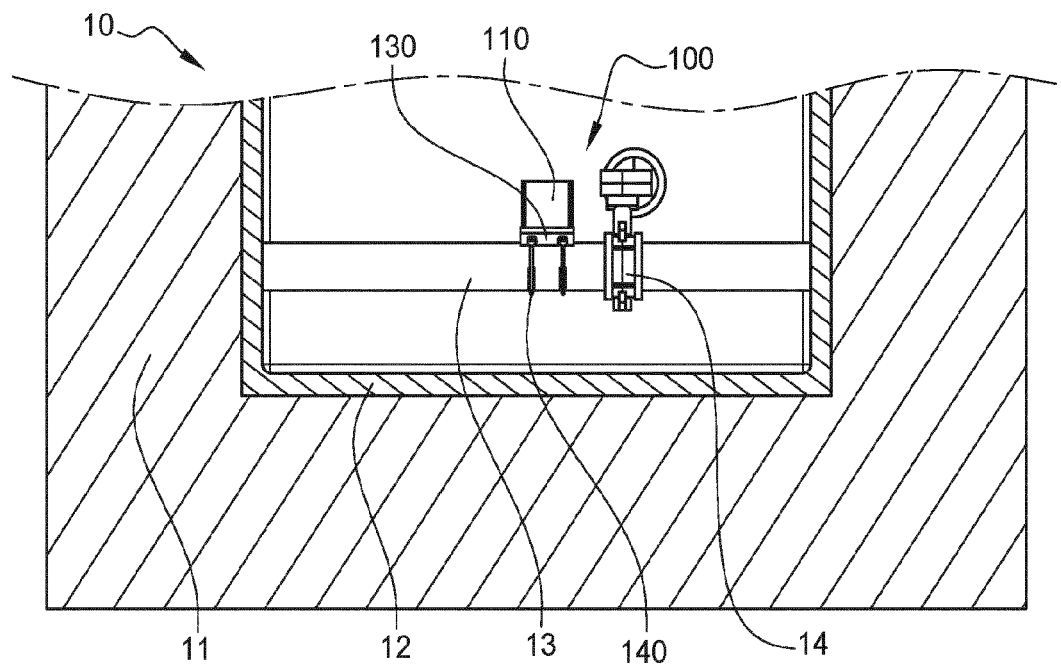
FIG. 1 represents a schematic front view of an example of a manhole of a water network including a hydraulic system according to the invention.

An example of a hydraulic system according to the invention, mounted in a manhole of a water network, is represented in FIG. 1. This FIG. 1 shows, in particular, a portion of the water network 10 including a manhole 12 installed in the ground 11 and through which passes a pipe 13, also called a conduit, inside which the water stream flows. In this portion of the water network 10, a block valve 14 is mounted to the pipe 13. It is understood that all kinds of valves and other devices necessary for the operation of the water network can be mounted, instead of or in addition to the block valve, to or in the vicinity of the pipe 13, in the manhole 12 or at any other location in the water network.

According to the example in FIG. 1, the hydraulic system 100 of the invention is mounted in the pipe 13 passing through the manhole 12 of the water network 10. The hydraulic system 100 of the invention can of course be installed in any pressure networks, such as irrigation networks, distribution networks or industrial networks with clean water having a low load of suspended matter or water loaded with particles or solid matter. As will be understood from the following, the hydraulic system 100 of the invention can be mounted to any part of any pipe of the pressure network, referred to indifferently as the water network or distribution network it can especially be mounted in an existing manhole 12 or in any manhole or room of the network, or even directly in the ground, as long as access to a section of the pipe is available.

This hydraulic system 100 includes a pico-turbine, not visible on this figure, housed inside the pipe 13, a sealed casing 110 in which are housed the various mechanical and electronic elements ensuring the measurements and the controls of the pico-turbine, and an adaptive base plate 130 attached to the pipe 13 by means of a clip system 140 and forming an interface between the pico-turbine and the sealed casing 11.

Figure 2:
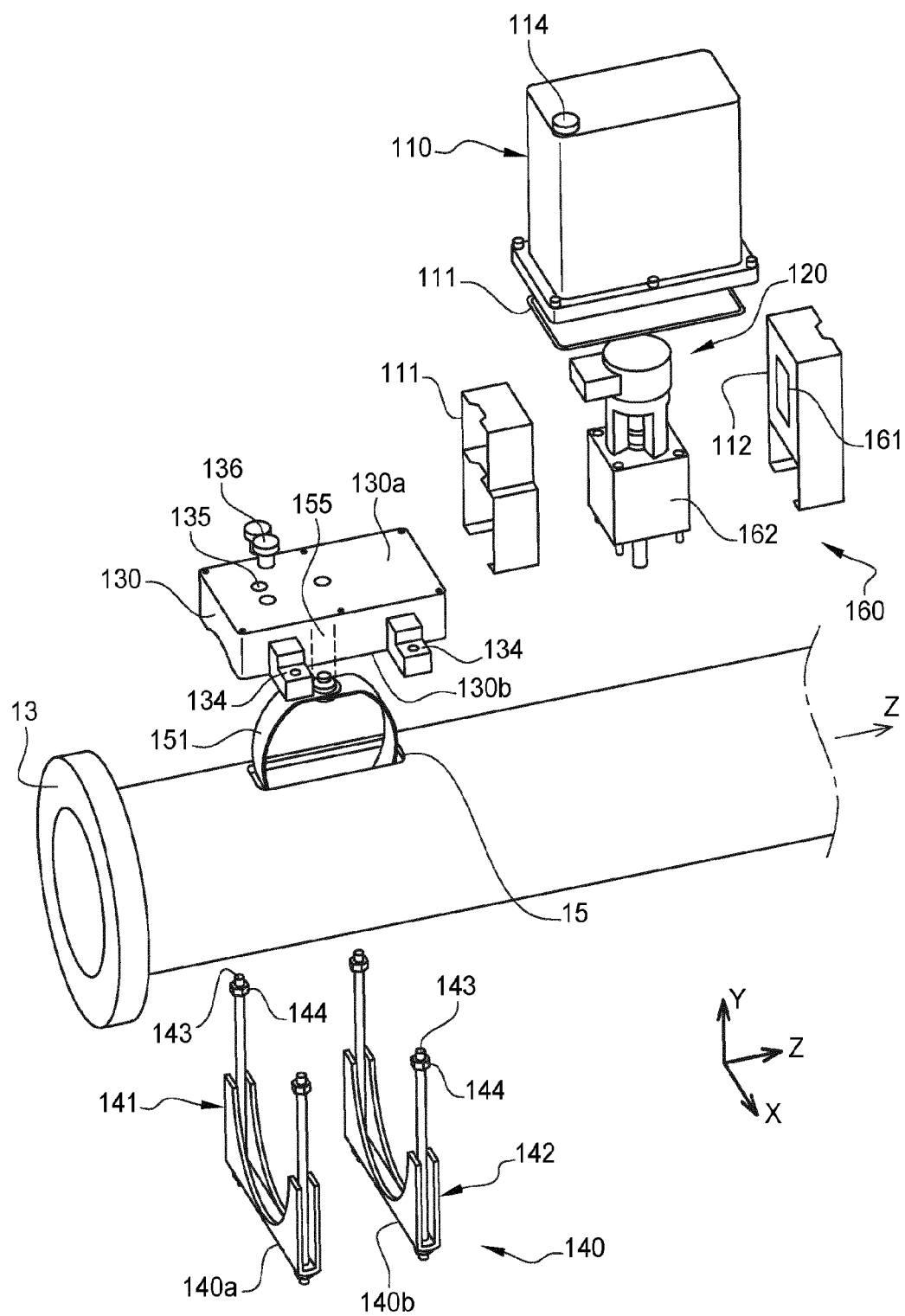
FIG. 2 represents an exploded schematic view of a hydraulic system according to the invention while being mounted in an existing water network.
Figure 3:
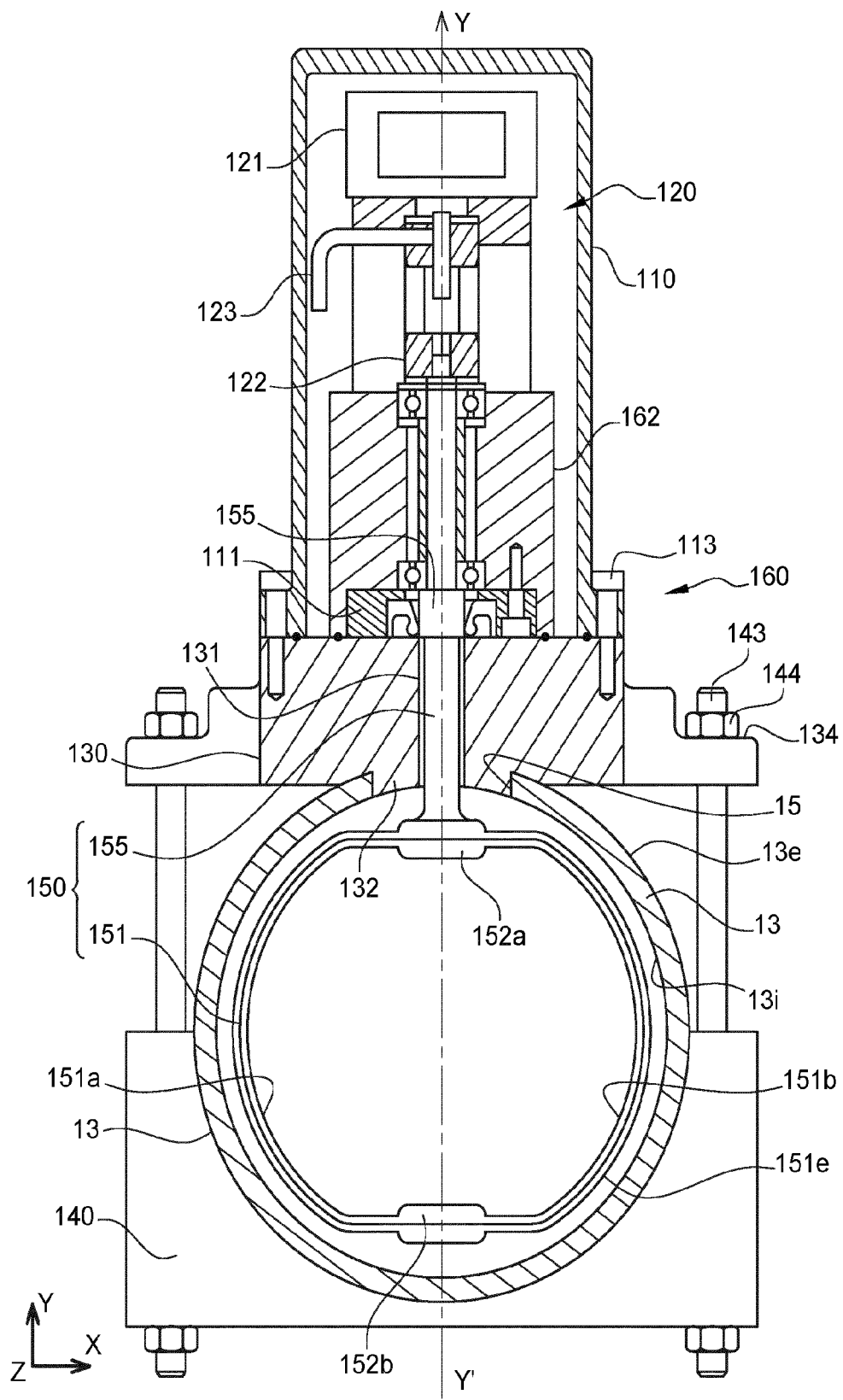
FIG. 3 represents a schematic cross-sectional view of a hydraulic system according to the invention mounted in a pipe of a water network.

A detailed view of the hydraulic system 100 is represented, respectively while being mounted and mounted to a pipe, in an exploded view in FIG. 2 and in a cross-sectional view in FIG. 3. These FIGS. 2 and 3 show the pipe 13 in which the pico-turbine 150 is housed. This pico-turbine 150 includes a substantially annular shaped blade 151, more simply called annular blade. This annular blade 151 is adapted to be installed inside the pipe 13 and to be moved by the lift forces generated by the water stream in the pipe. The annular blade 151 may be manufactured by an additive method, which guarantees maximum flexibility and ease of system construction despite blade shapes that may be relatively complex, or by any other conventional method, such as integral machining or casting.

The annular blade 151 can be made in a single piece; it can advantageously be formed of two circular arc blades 151a, 151b, having the same radius, mounted one after the other so as to form a sort of ring. The blade 151 is considered to have a ring shape, even if it has flats 152, as represented in FIG. 3, insofar as each of the two circular arc blades 151a, 151b is inscribed in an arc of a circle with a constant radius, which results from scanning a profile symmetrically to a median plane. This plane passes through the geometric centre of the pico-turbine 150 and is perpendicular to the axis of rotation YY'. The angular amplitude of the scan is, in one example configuration, +/−60° and can be substantially increased or decreased. The parts forming flats 152a, 152b of the annular blade form a regular extension of the circular arc blades 151a, 151b up to the hub. Given its shape, the blade 151 does not have any abrupt variation in cross-section, nor any central part, which makes it possible to avoid any interference drag effect, interference drags being known to generate losses within conventional pico-turbines.

In the remainder of the description, reference will be made either to an annular blade or to a circular arc blade, it being understood that two circular arc blades mounted end to end operate in the same way as a single annular blade, this/these blade(s) being mounted at a flat 152a to a single shaft 155, as described in more detail below.

In some embodiments, the blade 151 is formed of a plurality of circular arc blades. As previously explained, it may be formed of two circular arc blades mounted facing each other. Alternatively, the blade 151 may include at least three circular arc blades, attached to each other at the flats 152a, 152b and distributed in a generally spherical shape, the diameter of this spherical shape corresponding to the diameter of an annular blade. In this alternative, the plurality of circular arc blades may be distributed symmetrically or asymmetrically, depending, for example, on the circulation of the water stream. The person skilled in the art will understand that the term "annular blade" or "substantially annular blade" includes all blade shapes that are inscribed in one or more cross-sections of a sphere.

Figure 4:
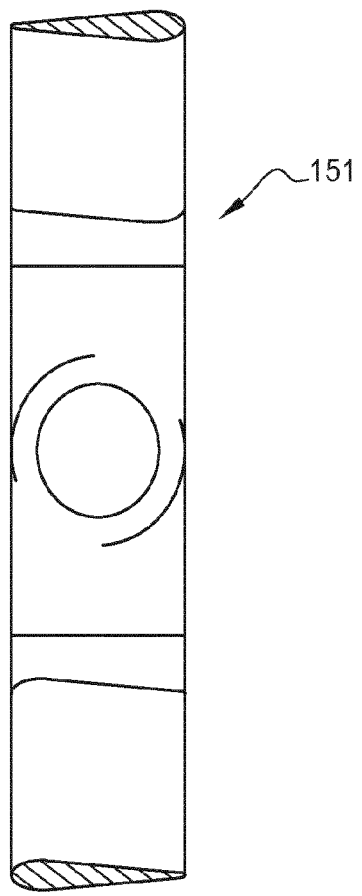
FIG. 4 represents a schematic cross-sectional view, along a horizontal median plane of the pipe, of an example of a blade profile of the pico-turbine of the hydraulic system according to the invention.

In preferred embodiments, and as represented in FIG. 4, the annular blade 151 includes a cross-section in the form of a standardised, low drag wing profile. This wing profile may be a low-thickness NACA profile, such as for example a NACA profile 15, that is, with a thickness of 15% of the chord length. A "NACA profile" refers to an aerodynamic profile, well known in the field of aeronautics, developed by the National Advisory Committee for Aeronautics to generally determine an aircraft wing profile as a function of desired flight parameters (lift, speed, drag, etc.). A NACA profile can of course be used in the field of water stream to minimise the drag generated by the annular blade of the pico-turbine in the water stream. The NACA profile is a profile which can be symmetrical, asymmetrical, convex, biconvex, etc., and which makes it possible to obtain a shape with especially a predefined lift and drag. There are many NACA profiles, each of which has a different shape that meets the aerodynamic criteria. The shape of a NACA profile is described by a series of digits (for example four, five or six digits) after the word "NACA". Each digit corresponds to the value of a parameter which, when entered into specific equations known to the skilled person, allows the cross-section of the aircraft wing to be precisely generated and its properties calculated. The parameter values, usually given in percent, correspond, for example, to the camber of the profile as a percentage of the chord length, the position of the maximum camber in tenths of the chord, and the maximum profile thickness in percent of the chord.

Other types of profiles, symmetrical or not, can be contemplated to obtain a low drag in the water stream, in the pipe 13, such as for example the Eppler profile. The pitch angle of the profile can, for example, be constant and close to 0, so that the chord of the annular blade is substantially perpendicular to the radius of the pico-turbine. In the example of FIG. 3, the chord and the pitch angle are constant quantities, but it may be contemplated to vary at least one of these two quantities, so as to optimise the operation of the pico-turbine 150.

According to the invention, and as represented in FIG. 3, the external radius of the annular blade 151 is smaller than the internal radius of the pipe 13, but is chosen so that the external face 151*e* of the annular blade 151 is as close as possible to the internal wall 13*i* of the pipe 13 so as to generate a minimum overall size within said pipe and, consequently, a very low or even almost zero impact on the hydraulic behaviour of the distribution network. In one embodiment of the invention, the external radius of the annular blade 151 is smaller than the internal radius of the pipe 13 subtracted by at least one time the thickness of the profile of the blade, thus avoiding any interaction between the annular blade 151 and the pipe 13. Optimally, and in order to recover sufficient energy, the external radius of the annular blade 151 is greater than at least ⅔ of the internal radius of the pipe.

In order to be able to be installed in the pipe 13, a flow-through opening 15 is made in the upper wall of the duct, for example by milling. This flow-through opening 15 has dimensions adapted to the circumference of the annular blade 151. As represented in FIG. 2, the flow-through opening 15 is rectangular, centred on the central axis Z of the pipe 13, with a length parallel to said axis Z and substantially greater than the diameter of the annular blade 151 and with a width substantially greater than the width of the annular blade, the width being the dimension along the axis X of the reference frame XYZ when the annular blade is being installed as in the example of FIG. 2. The blade 151 of the pico-turbine 150 being annular, an opening of relatively small dimensions is sufficient to allow passage of the pico-turbine in the pipe 13. As described hereinafter, the fact that the flow-through opening 15 is of reduced size (compared to an opening which has to allow passage of a conventional multi-blade turbine) allows it to be easily plugged to seal the pipe 13 and also to have little impact on the mechanical strength of said duct.

This opening allows the turbine 3 to be inserted into the duct. It is hollowed out along a rectangular cross-section, itself centred on the axis of the pipe and whose long side is parallel to the axis of the pipe. The long side of the rectangular cross-section is substantially longer than the external diameter of the turbine 3. The short side of the rectangular cross-section has a length substantially greater than the chord c of the profile used for generating the turbine blades. The chord of the profile c corresponds to the line segment built with the leading and trailing edge of the profile.

According to the invention, the pico-turbine 150 is a turbine of the family of cross flow turbines, whose axis of rotation YY' is perpendicular to the direction Z of the water stream inside the pipe 13. Thus, in the invention, the rotation shaft 155 supporting the annular blade 151 is mounted perpendicularly to the direction Z of the water stream, along the axis of rotation YY'. This rotation shaft 155—more simply called shaft or shaft of the pico-turbine—is attached to the annular blade 151, for example at the location of the upper flat 152*a*, and passes through the pipe 13 via the flow-through opening 15. As the annular blade 151 has a circumference adapted so that said annular blade is close to the inner wall 13*i* of the pipe 13, the shaft 155 opens into the pipe 13 in a zone close to said inner wall 13*i*, which makes it possible to prevent it from generating any vortices. The shaft 155 therefore has almost no impact on the hydraulic behaviour of the distribution network 10. In addition, since the shaft 155 is attached at a single point of the annular blade, the rotational guidance of the pico-turbine is cantilevered, which also makes it possible to limit the interference of the pico-turbine 150 with the water stream in the pipe 13, to maximise the conversion efficiency and to reduce the costs while facilitating the setting up of the pico-turbine in the pipe.

In some embodiments, the rotation shaft 155 is complemented by an additional rotation shaft extending between the blade 151 and the clip system 140, in the direction Y'. This additional rotation shaft may, for example, be mounted perpendicularly to the direction Z of the water stream, along the axis of rotation YY', and be attached to the annular blade 151 at a location opposite to the attachment location of the rotation shaft 155, such as, for example, at the location of the lower flat 152*b*. Thus, the annular blade 151 is held by both the rotation shaft 155 and the additional shaft, but neither shaft passes through the pipe 13.

Thus, the pico-turbine 150 as just described has the advantage of being insensitive to the direction of the water stream. Indeed, whether the water stream is in the direction Z or in the direction −Z, the annular blade 151 driven by the shaft 155 can rotate indifferently in one direction or in the other, with no impact on the flow. In addition, the pico-turbine 150 has the capacity to operate over a wide range of flow speeds, that is, whatever the zone where the water network 10 is set up and whatever the time of the day, and this even at low speeds in the order of 1 m/s. Furthermore, and in contrast to conventional multi-blade configurations, the pico-turbine 150 is called "erasable", that is, with little or no effect on the hydraulic behaviour in the pipe, when the diameter of the annular blade 151 is parallel to the plane XY perpendicular to the axis Z of the flow. Indeed, in this configuration where the width of the annular blade is parallel to the wall of the pipe, the surface occupied by the pico-turbine 150 is less than 10% of the cross-section of the pipe and the head losses generated are less than 2% of the total load measured at the system, the head losses being all the lower as the flow speed is low.

The shaft 155, rotatably driven by the annular blade 151, in turn drives the generator unit 120 which transforms the mechanical rotational energy generated by the annular blade under the effect of the water stream, into electrical energy. The generator unit 120 is installed out of the pipe 13 and therefore out of the water stream. The generator unit 120 is connected to a control unit 160, which is also installed out of the pipe 13 and thus out of the water stream. In some embodiments, the control unit ensures, on the one hand, the control of the distribution of the electrical energy collected and, on the other hand, the rotation of the pico-turbine as a function of the characteristics of the water stream. In other embodiments, the control unit can be coupled with a measurement unit which ensures a measurement, for example indirectly, of the water flow rate and/or a measurement of the direction of the water stream. The measurement unit may, for example, be integrated in the control unit. When a measurement unit is coupled or integrated with the control unit, the control unit is referred to as a "measurement and control unit". In the remainder of the description, the term measurement and control unit will be used, it being understood that, when measurements of the water flow rate and/or direction of water stream are not useful or performed by outer devices such as sensors, a simple control unit may be used.

The measurement and control unit 160 may be housed in a casing 162 fitted with a sealing system 111, preventing any backflow of fluid from the pressure conduit 113. The measurement and control unit 160 includes a standard bearing system, such as for example ball or roller bearings, which have the advantage of being both relatively inexpensive and of limiting energy losses by friction. In one example, the bearing system includes rigid ball bearings, including a single row of balls. Other types of bearings can of course be contemplated depending on the forces to be transmitted.

The measurement and control unit 160 additionally includes a processing unit, for example in the form of a microcontroller 161, for controlling position of the annular blade 151 in the channel 13 via the shaft 155. The measurement and control unit 160 may furthermore include a variator, associated with the generator unit 120 and controlled by the microcontroller 161. This variator, just like the microcontroller 161, may be standard components, of relatively small size, housed for example in a rack 112. The rack 112 can also accommodate a telecommunication module, for example a radio module or a module using standard communication protocols such as GSM, WiFi or Bluetooth, capable of exchanging data with a remote processing system.

The measurement and control unit 160 is provided to control distribution of the electrical energy collected by the generator unit 120 and to ensure the driving of the pico-turbine 150 by searching for the optimal operating points as a function of the water flow rates in the pipe 13. The values of the water flow rate can, indeed, be obtained by calculation from the operating characteristics of the pico-turbine in the torque-speed plane. Indeed, from the flow speed measured in the duct, the measurement and control unit 160 can deduce the flow rate which transits in the pipe 13. The hydraulic system 100 thus makes it possible to know the water flow rates in a speed range between 0.5 m/s and 1.5 m/s, without requiring the use of a flow meter, which is not only expensive in terms of purchase cost but also energy consuming in terms of power consumption. However, an additional flow measurement may be provided by an auxiliary measurement sensor, integrated or not in the hydraulic system; in the case of an additional flow measurement, the measurement sensor may be for example one of the measurement sensors mounted in the adaptive base plate 130, as described hereinafter.

The calculation of the water flow rate in the pipe may especially allow use of pressure relief devices to limit the hydraulic pressure, for example in water supply networks with high level differences. When the flow rate determination shows a pressure surplus, the latter can either be converted into electric power using the generator unit, or directly dissipated into heat by stirring the water using the runaway operating pico-turbine, or both at the same time.

When the pressure surplus is converted into electric power, this electric power can be stored in electrical energy storage devices, thus regulating the hydraulic load.

Indeed, according to certain embodiments, the hydraulic system 100 may include one or more energy storage devices, such as for example accumulators, making it possible to store the electrical energy produced by the generator unit 120 in order to ensure the continuity of the operation of the measurement and control unit 160 of the pico-turbine as well as the continuity of the measurements by the measurement sensors, despite the variability of the flow in the pipe 13 (the variability being due especially to the differences in consumption between the different times of the day). These electric power storage devices may, for example, be housed in racks 111 installed in the sealed casing 110 described more precisely hereinafter. They are preferably chosen so as to ensure at least 12 hours of electrical autonomy for the measurement and control unit.

The generator unit 120 includes a motor or generator 121 capable of transforming the mechanical rotational energy of the pico-turbine 150 into electric power. In order to limit the manufacturing costs of the hydraulic system 100, the generator unit 120 is preferably chosen from standard components. It may, for example, be an electronically switched brushless DC generator 120, such a generator having the dual advantage of allowing for reduced maintenance and improved operating efficiency compared to a brush DC machine. A brushless DC generator also has the advantage of operating efficiently over a wide range of the torque—speed plane, for modest powers of less than about 1 kW, this being all the more important when the flow rates in the pipe are variable.

According to some embodiments, the drive of the generator unit 120 is made directly by the shaft 155 and by means of a coupling joint 122. Directly assembling the shaft 155 with the generator unit 120 has the advantage of ensuring the mountability of the assembly while reducing manufacturing requirements and therefore costs. Directly assembling the shaft 155 with the generator unit 120 makes it possible to reduce energy losses in the conversion process by avoiding a speed multiplication or reduction stage. This furthermore improves the estimation of the torque provided by the pico-turbine 150 and consequently increases the accuracy of the flow rate measurement, as explained hereinafter.

Of course, it can still be contemplated that the generator unit 120 includes a speed multiplier, which is then integrated into the shaft line 155. Such a speed multiplier has the advantage of reducing the mechanical torque at the generator, thus reducing the size of said generator. In this alternative, the speed multiplier associated with the generator 121 is chosen from standard components and driven by a generic microcontroller so as to limit the production costs of the hydraulic system 100.

The generator unit is housed in the sealed casing 110 designed to avoid any wet backflow of the pico-turbine towards the generator unit and all the other electronic and/or mechanical components necessary for the operation of the hydraulic system 100. More precisely, the sealed casing 110 delimits a sealed enclosure making it possible to guarantee the reliability of the hydraulic system 100 by ensuring the protection of the measurement and control unit 160, of the racks 111 and 112, of the generator unit 120 and, more generally, of all the electronic and electromechanical elements of the hydraulic system. For this, the sealed casing 110 includes a sealing system 111 including, for example, a standard lip seal positioned around the shaft 155 and capable of withstanding a water pressure adapted to the pressure of the water stream circulating in the pipe 13. This lip seal is preferably made of a material such that the coefficient of friction with the shaft 155 is minimised, so as not to affect the drinkability of the water. This lip seal may, for example, be made of Polytetrafluoroethylene (or PTFE). In an alternative, when the pressure of the water circulating through the pipe is higher than the maximum pressure withstood by the lip seal, several identical or different lip seals can be mounted in series with each other.

The sealed casing 110 may be removable, for example attached by a screw system 113 to the adaptive base plate 130 described hereinafter, so as to allow possible human intervention on the components housed inside said sealed casing.

In an alternative, the sealed casing 110 may include one or more raceways 114 for passing electrical wiring, such as for example electrical cables for distributing electrical energy to external components, such as the measurement sensors, and/or a communication channel, for example full-duplex, allowing transfer of data to an outer physical medium or communication device.

In one embodiment, such as that represented in FIG. 3, the generator unit 120 includes a handle 123 or pin for locking the shaft 155, ensuring the reliability of the hydraulic system in case of damage. Indeed, in case of damage to the hydraulic system and especially to the pico-turbine driving system, it is then possible to block, by means of the handle 123, the annular blade 151 in such a position that the interference between the pico-turbine and the water stream in the pipe 13 is minimised. In other words, in the event of damage to the pico-turbine control system, the handle 123 allows the annular blade 151 to be manually positioned in a so-called "furling" position where said annular blade 151 is parallel to the pipe 13 so as not to disturb the water stream while waiting for the driving system to be repaired. In this embodiment, the handle 123 may be housed inside the sealed casing 110, as in the example of FIG. 3, or may pass through said sealed casing via an opening fitted with a seal.

As represented in FIGS. 2 and 3, the sealed casing 110 is mounted to the adaptive base plate 130, installed around the shaft 155, out of the pipe 13. This adaptive base plate 130 is a piece mechanically interfacing between the pipe 13 and the sealed casing 110. For this, the adaptive base plate 130 includes a planar upper surface 130a and a concave lower surface 130b, the upper surface 130a being capable of supporting the sealed casing 110 with the elements housed therein, the lower surface 130b being designed to fit snugly the external shape of the duct 13 and allow passage of the shaft 155. According to a first alternative, the adaptive base plate 130 may be a solid piece, for example made of stainless steel or of a plastic compatible with the drinkability of water, the upper surface 130a of which is substantially planar and the lower surface 130b of which has a curvature complementary to the circumference of the external wall 13e of the pipe 13 and an opening 131 adapted to have the shaft 155 passing therethrough. The adaptive base plate 130 may, according to a second alternative, be a hollow piece the wall of which includes a planar upper surface 130a and a lower surface 130b having a curvature complementary to the circumference of the external wall 13e of the pipe 13. The lower surface 130b and the upper surface then each include an opening 131 adapted to let the shaft 155 through. In this second alternative, the adaptive base plate 130 may accommodate therein one or more measurement sensors, not represented in the figures. These measurement sensors may be, for example, leak detection sensors, pressure sensors, flow rate sensors, physicochemical analysis sensors, etc.

Whatever the alternative, the adaptive base plate 130 is made mainly as a function of three parameters characterising the pipe 13: its external diameter 13e, the roughness of its external wall 13e and the type of material. This adaptive base plate 130 allows the pico-turbine 150 to be directly set up on an existing pipe, only after making a flow-through opening 15 in the pipe wall. Of course, the hydraulic system 100 can also be mounted to a new pipe, before mounting the pipe in the water network 10 or after mounting said pipe in the water network 10. In order to ensure a hermetic mounting of the hydraulic system 100 to the pipe (new or existing), the adaptive base plate 130 includes, on its lower surface 130b, a plug 132 on its lower surface 130b to ensure hermetic closure of the opening 15 of the pipe 13. This plug 132 may be directly integrated into the lower surface 130b of the adaptive base plate or added and attached to said lower surface. This plug 132 may be formed by the concave lower surface 130b of the adaptive base plate 130, flush with the internal wall 13i of the pipe and adapted to replace the extruded part of the flow-through opening 15 of the pipe. This plug 132 avoids disturbing the water stream in the pipe, by avoiding the creation of singular head losses, detrimental to the operation of the water network.

According to an alternative, the adaptive base plate 130 may include upper openings 135 designed to allow passage of the measurement sensors when housed in said adaptive base plate. These openings 135 may be closed by caps 136 when the adaptive base plate contains no or few measurement sensors.

To ensure that the adaptive base plate 130 is held on the pipe 13, the hydraulic system includes a clip system 140 positioned partially around the pipe 13 and attached to said adaptive base plate. The central part of the clip system 140 preferably fits snugly the duct 13 up to its median plane, which has the advantage of distributing the mechanical stresses applied to said duct. The clip system 140 may include a single clip that fits snugly the shape of the pipe 13 and has a relatively large area of contact with said pipe, for example an area substantially equal to the length of the adaptive base plate 130. The clip system 140 may also include, as shown in FIG. 2, two clips 141 and 142 each fitting snugly the shape of the duct 13. In a preferred embodiment, the upper ends 143 of both clips 141, 142 end in a thread onto which a nut 144 can be screwed, these upper ends 143 being designed to each pass through a lateral opening 134 made in the adaptive base plate 130. Tightening the nut 144, for example with a torque spanner, makes it possible to adjust the forces in the clips 141, 142 depending on the mechanical characteristics of the duct 13, this tightening having to be sufficient to seal the assembly, without damaging the duct. In one embodiment, the two clips 141, 142 may have a U shape with the free end of each leg including a thread. In another embodiment, such as that represented in FIG. 2, each of the clips 141, 142 includes a base 140a, in which two holes are made for two tie rods 140b placed on either side of the duct 13 to pass therethrough. In yet another embodiment, the two clips 141, 142 are absent and the adaptive base plate 130 is attached directly by welding to the duct 13.

In the embodiments just described, the hydraulic system 100 includes a pico-turbine 150, a generator unit 120 and a control unit 160 or measurement and control unit. In other embodiments, a hydraulic system 100 may include several pico-turbines, for example mounted in series in the pipe, and/or several generator units and/or several control units, different coupling configurations between the pico-turbines, the generator units and the control units being feasible. Examples of coupling configurations may be: several pico-turbines coupled with a single generator unit and a single control unit or several pico-turbines and several generator units coupled with a single control unit or several control units and several generator units coupled with a single pico-turbine, etc. In other embodiments, for example when the hydraulic load is large, several hydraulic systems 100 may be mounted in series and coupled, for example, by a mechanical coupling device or a synchronisation unit.

Although described through a number of examples, alternatives and embodiments, the hydraulic system according to the invention comprises various alternatives, modifications and improvements which will be obvious to the person skilled in the art, it being understood that these alternatives, modifications and improvements are within the scope of the invention.

The invention claimed is:

1. A hydraulic system for generating electrical energy from a water stream in a hydraulic network, comprising:
at least one cross flow pico-turbine mounted to a shaft extending perpendicularly to a direction of said water stream, said at least one cross flow pico-turbine including a substantially annular shaped blade installed in the water stream to generate mechanical rotational energy, the substantially annular shaped blade including at least two circular arc blades mounted end to end, and the shaft of the pico-turbine being mounted at a single point of the annular blade, at a junction between the ends of the two circular arc blades,
at least one generator unit, installed out of the water stream and coupled with the shaft of the pico-turbine to transform the mechanical rotational energy into electrical energy,
at least one control unit, installed out of the water stream, connected to the at least one generator unit, controlling distribution of the electrical energy collected as well as a rotation of the at least one cross flow pico-turbine as a function of characteristics of the water stream, and
an adaptive base plate, installed out of the water stream, which keeps the shaft of the at least one cross flow pico-turbine radial with respect to the direction of the water stream, and which supports the control unit as well as the at least one generator unit.

2. The hydraulic system according to claim 1, further comprising a measurement unit configured to make a measurement of the flow rate of the water stream.

3. The hydraulic system according to claim 2, wherein the measurement unit is adapted to determine the direction of the water stream.

4. The hydraulic system according to claim 1, wherein the substantially annular shaped blade has a cross-section in the form of a wing profile.

5. The hydraulic system according to claim 1, further comprising at least one measurement sensor mounted in the adaptive base plate.

6. The hydraulic system according to claim 1, wherein the at least one generator unit includes a brushless DC generator connected to a microcontroller.

7. The hydraulic system according to claim 1, wherein the at least one control unit includes a telecommunication module capable of exchanging data with a remote processing system.

8. The hydraulic system according to claim 1, further comprising a device for storing electric power produced.

9. The hydraulic system according to claim 1, further comprising a clip system capable of holding the adaptive base plate around a pipe in which the water stream circulates.

10. The hydraulic system according to claim 1, further comprising a sealed casing in which at least the at least one generator unit and the at least one control unit are housed.

11. A water network including at least one pipe of a pipe network in which a water stream circulates, the water network comprising at least one hydraulic system according to claim 1, mounted in said at least one pipe of the water network, the at least one cross flow pico-turbine being housed inside the at least one of pipe and the at least one generator unit and at least one control unit being housed outside said at least one of pipe.

12. The water network according to claim 11, wherein the at least one pipe includes a flow-through opening, having dimensions adapted to the external dimensions of the at least one cross flow pico-turbine so as to allow passage of the substantially annular shaped blade inside the at least one pipe, the flow-through opening being capable of having the shaft of the at least one cross flow pico-turbine passing therethrough.

13. The water network according to claim 12, wherein the adaptive base plate of the hydraulic system, includes a lower surface forming a plug around the shaft of the at least one cross flow pico-turbine, capable of hermetically closing the flow-through opening.

14. The water network according to claim 11, wherein the adaptive base plate of the hydraulic system, includes a lower surface of rounded shape, adapted to fit snugly an external wall of the at least one pipe.

15. The water network according to claim 11, wherein the substantially annular shaped blade of the at least one cross flow pico-turbine includes an external radius greater than at least ⅔ of an internal radius of the at least one pipe in which the pico-turbine is housed.

16. The water network according to claim 11, wherein the hydraulic system is installed in a manhole of said network, on an existing pipe.

17. A hydraulic system for generating electrical energy from a water stream in a hydraulic network, comprising:
at least one cross flow pico-turbine mounted to a shaft extending perpendicularly to a direction of said water stream, said pico-turbine including a substantially annular shaped blade installed in the water stream to generate mechanical rotational energy, the substantially annular shaped blade including two circular arc blades, having a same radius, mounted end to end, and the shaft of the pico-turbine being mounted at a single point of the annular blade, at a junction between the ends of the two circular arc blades,
at least one generator unit, installed out of the water stream and coupled with the shaft of the pico-turbine to transform the mechanical rotational energy into electrical energy,
at least one control unit, installed out of the water stream, connected to the generator unit, controlling distribution of the electrical energy collected as well as the rotation of the pico-turbine as a function of the characteristics of the water stream, and an adaptive base plate, installed out of the water stream, which keeps the shaft of the at least one cross flow pico-turbine radial with respect to the direction of the water stream, and which supports the control unit as well as the at least one generator unit.

* * * * *

UNITED STATES PATENT AND TRADEMARK OFFICE
CERTIFICATE OF CORRECTION

| | | |
|---|---|---|
| PATENT NO. | : 12,276,246 B2 | Page 1 of 1 |
| APPLICATION NO. | : 18/010730 | |
| DATED | : April 15, 2025 | |
| INVENTOR(S) | : Nicolas Dellinger et al. | |

It is certified that error appears in the above-identified patent and that said Letters Patent is hereby corrected as shown below:

On the Title Page

Item (72) Inventors: the last name of the third inventor should read:
José VAZQUEZ Signed and Sealed this
Third Day of June, 2025

Coke Morgan Stewart
*Acting Director of the United States Patent and Trademark Office*